United States Patent
Huang et al.

(10) Patent No.: US 7,389,125 B2
(45) Date of Patent: Jun. 17, 2008

(54) MOBILE TERMINAL FOR USE WITH A CONTROL TERMINAL IN A WIRELESS COMMUNICATIONS NETWORK

(76) Inventors: Hsin-Yi Huang, No. 19, Sec. 1, Tan-Fu Rd., Tan-Tzu Hsiang, Taichung Hsien (TW); Yu-Ting Huang, No. 19, Sec. 1, Tan-Fu Rd., Tan-Tzu Hsiang, Taichung Hsien (TW)

( * ) Notice: Subject to any disclaimer, the term of this patent is extended or adjusted under 35 U.S.C. 154(b) by 686 days.

(21) Appl. No.: 10/962,561

(22) Filed: Oct. 13, 2004

(65) Prior Publication Data
US 2005/0266873 A1  Dec. 1, 2005

(30) Foreign Application Priority Data
May 28, 2004  (TW) ................ 93115336 A

(51) Int. Cl.
*H04B 7/212* (2006.01)
(52) U.S. Cl. .................... 455/550.1; 455/566
(58) Field of Classification Search ........ 455/412, 455/566, 420, 466, 567
See application file for complete search history.

(56) References Cited

U.S. PATENT DOCUMENTS 6,314,306 B1 *  11/2001  Harris .................. 455/566
2007/0093251 A1 *  4/2007  Casaccia ................ 455/445

* cited by examiner

*Primary Examiner*—Vincent P. Harper
*Assistant Examiner*—Phuoc Doan
(74) *Attorney, Agent, or Firm*—Banner & Witcoff, Ltd.

(57) ABSTRACT

A mobile terminal is suitable for use with a control terminal in a wireless communications network. The control terminal is configured with switching control identification data that are associated with predetermined ring tones parameters such that the control terminal is capable of outputting a control signal based on the number or duration of ring tones received thereby from an authorized caller. Upon receipt of control code data via a user input unit, a processor unit of the mobile terminal enables establishing of a communications link with the control terminal with reference to a call data code portion of the control code data, and terminates automatically the communications link after a duration corresponding to a termination control code portion of the control code data.

2 Claims, 1 Drawing Sheet

US 7,389,125 B2

MOBILE TERMINAL FOR USE WITH A CONTROL TERMINAL IN A WIRELESS COMMUNICATIONS NETWORK

CROSS-REFERENCE TO RELATED APPLICATION

This application claims priority of Taiwanese Application No. 093115336, filed on May 28, 2004.

BACKGROUND OF THE INVENTION

1. Field of the Invention

The invention relates to a mobile terminal, more particularly to a mobile terminal for use with a control terminal in a wireless communications network.

2. Description of the Related Art

Recently, it is possible to control a switch device using a mobile terminal, such as a mobile phone, in a wireless communications network, such as a public land mobile phone network (PLMN). A conventional method of controlling a switch device using a mobile terminal in a wireless communications network is disclosed in U.S. Patent Publication No. 2004-0082310A1. In this Patent Publication, the number or duration of ring tones that is associated with an authorized incoming call received by the mobile terminal for controlling the switch device is under the control of a caller who placed the incoming call. Specifically, the caller terminates the communications link with the mobile terminal based on the number of returned ring tones heard by the caller. Therefore, improper control of the switch device is likely to occur when the caller establishes the communications link with the mobile terminal while in a noisy environment.

The entire disclosure of U.S. Patent Publication No. 2004-0082310A1 is incorporated herein by reference.

SUMMARY OF THE INVENTION

Therefore, the object of the present invention is to provide a mobile terminal for use with a control terminal in a wireless communications network which can overcome the above drawbacks associated with the aforesaid prior art.

According to one aspect of the present invention, a mobile terminal comprises:

a radio frequency module;

a user input unit;

a memory unit for storing call data that includes a set of call numbers, and termination control data that are associated with predetermined ring tone parameters; and a processor unit coupled to the radio frequency module, the user input unit and the memory unit;

the processor unit receiving control code data inputted via the user input unit, the control code data including a call data code portion corresponding to one of the call numbers stored in the memory unit, and a termination control code portion corresponding to one of the predetermined ring tone parameters stored in the memory unit;

the processor unit being responsive to the control code data such that the mobile terminal establishes a communications link with a wireless communications network via the radio frequency module with reference to the call data code portion, and terminates automatically the communications link after a duration corresponding to the termination control code portion.

According to another aspect of the present invention, there is provided a mobile terminal for use with a control terminal in a wireless communications network. The control terminal is configured with switching control identification data that are associated with predetermined ring tone parameters. The mobile terminal comprises:

a radio frequency module;

a user input unit;

a memory unit for storing call data that includes a call number of the control terminal, and termination control data that are associated with the predetermined ring tone parameters corresponding to the switching control identification data configured in the control terminal; and a processor unit coupled to the radio frequency module, the user input unit and the memory unit;

the processor unit receiving control code data inputted via the user input unit, the control code data including a call data code portion corresponding to the call number of the control terminal stored in the memory unit, and a termination control code portion corresponding to one of the predetermined ring tone parameters stored in the memory unit;

the processor unit being responsive to the control code data such that the mobile terminal establishes a communications link with the control terminal in the wireless communications network via the radio frequency module with reference to the call data code portion, and terminates automatically the communications link with the control terminal after a duration corresponding to the termination control code portion.

As such, the control terminal is capable of outputting a control signal associated with the switching control identification data that corresponds to the termination control code portion of the control code data inputted via the user input unit of the mobile terminal.

According to a further aspect of the present invention, a control system comprises:

a control terminal configured with switching control identification data that are associated with predetermined ring tone parameters; and a mobile terminal including a radio frequency module;

a user input unit;

a memory unit for storing call data that includes a call number of the control terminal, and termination control data that are associated with the predetermined ring tone parameters corresponding to the switching control identification data configured in the control terminal; and a processor unit coupled to the radio frequency module, the user input unit and the memory unit, the processor unit receiving control code data inputted via the user input unit, the control code data including a call data code portion corresponding to the call number of the control terminal stored in the memory unit, and a termination control code portion corresponding to one of the predetermined ring tone parameters stored in the memory unit, the processor unit being responsive to the control code data such that the mobile terminal establishes a communications link with the control terminal in the wireless communications network via the radio frequency module with reference to the call data code portion, and terminates automatically the communications link with the control terminal after a duration corresponding to the termination control code portion;

the control terminal being capable of outputting a control signal associated with the switching control identification data that corresponds to the termination control code portion of the control code data inputted via the user input unit of the mobile terminal.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
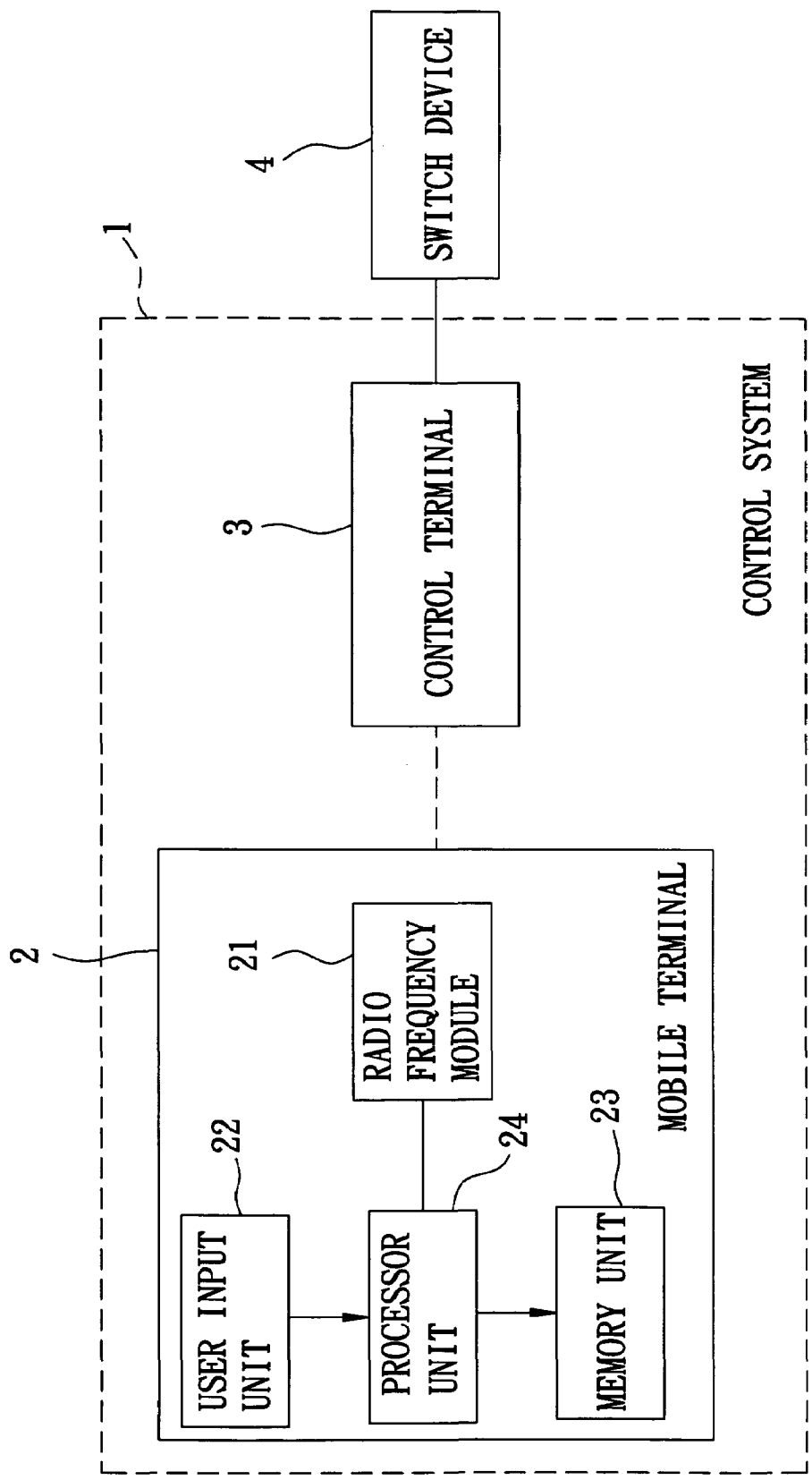
FIG. 1 is a schematic electrical circuit block diagram illustrating the preferred embodiment of a control system according to the present invention.

Referring to FIG. 1, the preferred embodiment of a control system 1 according to the present invention is shown to include a control terminal 3, and a mobile terminal 2.

The control terminal 3 is adapted for controlling a switch device 4 connected thereto, and is configured with switching control identification data that are associated with predetermined ring tone parameters. In this embodiment, the control terminal 3 is of the type disclosed in U.S. patent Publication No. 2004-0082310A1, entitled "METHOD OF CONTROLLING A SWITCH DEVICE USING A MOBILE TERMINAL IN A WIRELESS COMMUNICATIONS NETWORK", and published on Apr. 29, 2004.

The mobile terminal 2, such as a portable computer, a mobile phone, an electronic book or a personal digital assistant, includes a radio frequency module 21, a user input unit 22, a memory unit 23, and a processor unit 24. The memory unit 23 stores call data that includes a call number of the control terminal 3, and termination control data that are associated with the predetermined ring tone parameters corresponding to the switching control identification data stored in the control terminal 3. The processor 24 is coupled to the radio frequency module 21, the user input unit 22 and the memory unit 23, and receives control code data inputted via the user input unit 22. The control code data includes a call data code portion corresponding to the call number of the control terminal 3 stored in the memory unit 23, and a termination control code portion corresponding to one of the predetermined ring tone parameters stored in the memory unit 23.

The processor unit 24 is responsive to the control code data such that the mobile terminal 2 establishes a communications link with the control terminal 3 in a wireless communications network (such as a public land mobile phone network (PLMN)), via the radio frequency module 21 with reference to the call data code portion, and terminates automatically the communications link with the control terminal 3 after a duration corresponding to the termination control code portion.

As such, the control terminal 3 is capable of outputting a control signal associated with the switching control identification data that corresponds to the termination control code portion of the control code data inputted via the user input unit 22 of the mobile terminal 2.

For example, if a number (m) of call numbers are stored in the memory unit 23, and a number (n) of predetermined ring tone parameters are configured in the control terminal 3, the control code data inputted by a user via the user input unit 22 of the mobile terminal 2 is expressed as RmCn *, where "Rm" indicates the termination control code portion and can be an integer ranging from 1 to m, "Cn" indicates the call data code portion (e.g., a speed dialing code for a preset call number of the control terminal 3 stored in the memory unit 23) and can be an integer ranging from 1 to n, and "*", indicates a command identification code.

In view of the foregoing, by inputting the control code data into the mobile terminal 2, accurate control of the switch device 4 can be achieved in the control system of this invention since termination of the communications link after an appropriate duration is conducted automatically by the mobile terminal 2 without the need for the user to monitor returned ring tones.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A mobile terminal for use with a control terminal in a wireless communications network, the control terminal being configured with switching control identification data that are associated with predetermined ring tone parameters, said mobile terminal comprising:
   a radio frequency module;
   a user input unit;
   a memory unit for storing call data that includes a call number of the control terminal, and termination control data that are associated with the predetermined ring tone parameters corresponding to the switching control identification data configured in the control terminal; and
   a processor unit coupled to said radio frequency module, said user input unit and said memory unit,
   said processor unit receiving control code data inputted via said user input unit, the control code data including a call data code portion corresponding to the call number of the control terminal stored in said memory unit, and a termination control code portion corresponding to one of the predetermined ring tone parameters stored in said memory unit,
   said processor unit being responsive to the control code data such that said mobile terminal establishes a communications link with the control terminal in the wireless communications network via said radio frequency module with reference to the call data code portion, and terminates automatically the communications link with the control terminal after a duration corresponding to the termination control code portion;
   whereby the control terminal is capable of outputting a control signal associated with the switching control identification data that corresponds to the termination control code portion of the control code data inputted via said user input unit of said mobile terminal.

2. A control system comprising:
   a control terminal configured with switching control identification data that are associated with predetermined ring tone parameters; and
   a mobile terminal including
   a radio frequency module;
   a user input unit;
   a memory unit for storing call data that includes a call number of said control terminal, and termination control data that are associated with the predetermined ring tone parameters corresponding to the switching control identification data configured in said control terminal; and a processor unit coupled to said radio frequency module, said user input unit and said memory unit, said processor unit receiving control code data inputted via said user input unit, the control code data including a call data code portion corresponding to the call number of said control terminal stored in said memory unit, and a termination control code portion corresponding to one of the predetermined ring tone parameters stored in said memory unit, said processor unit being responsive to the control code data such that said mobile terminal establishes a communications link with said control terminal in the wireless communications network via said radio frequency module with reference to the call data code portion, and terminates automatically the communications link with said control terminal after a duration corresponding to the termination control code portion;

said control terminal being capable of outputting a control signal associated with the switching control identification data that corresponds to the termination control code portion of the control code data inputted via said user input unit of said mobile terminal.

* * * * *